United States Patent
Fernandez et al.

(10) Patent No.: US 10,899,614 B2
(45) Date of Patent: Jan. 26, 2021

(54) METHOD AND APPARATUS FOR PRODUCING A MIXTURE OF CARBON MONOXIDE AND HYDROGEN

(71) Applicant: L'Air Liquide, Societe Anonyme pour l'Etude et l'Exploitation des Procedes Georges Claude, Paris (FR)

(72) Inventors: Angela Fernandez, Paris (FR); Antoine Hernandez, Pontault Combault (FR); Jean-Marc Tsevery, Lieusaint (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 191 days.

(21) Appl. No.: 15/759,908

(22) PCT Filed: Jul. 20, 2016

(86) PCT No.: PCT/FR2016/051865
§ 371 (c)(1),
(2) Date: Mar. 14, 2018

(87) PCT Pub. No.: WO2017/046462
PCT Pub. Date: Mar. 23, 2017

(65) Prior Publication Data
US 2018/0251373 A1    Sep. 6, 2018

(30) Foreign Application Priority Data
Sep. 18, 2015 (FR) ...................................... 15 58788

(51) Int. Cl.
*C01B 3/50* (2006.01)
*F25J 3/02* (2006.01)

(52) U.S. Cl.
CPC .............. *C01B 3/508* (2013.01); *C01B 3/506* (2013.01); *F25J 3/0223* (2013.01); *F25J 3/0252* (2013.01);
(Continued)

(58) Field of Classification Search
CPC ........ C01B 3/508; C01B 3/506; F25J 3/0223; F25J 3/0252; F25J 3/0261
See application file for complete search history.

(56) References Cited

U.S. PATENT DOCUMENTS 3,937,796 A * 2/1976 Bhan .......................... C01B 5/00
423/580.1
4,488,890 A  12/1984 Foerg et al.
(Continued)

FOREIGN PATENT DOCUMENTS

EP    1 479 990    11/2004

OTHER PUBLICATIONS

International Search Report and Written Opinion for PCT/FR2016/051865, dated Oct. 14, 2016.

*Primary Examiner* — Paul A Wartalowicz
(74) *Attorney, Agent, or Firm* — Justin K. Murray

(57) ABSTRACT

In a method for producing a gaseous mixture of CO and $H_2$, a first gas comprising at least 50% CO is compressed in a first compressor to form a first compressed gas cooled to a first temperature and mixes with a second gas comprising at least 50% hydrogen in order to form the gaseous mixture, at least one of the first and second gases originating from a cryogenic distillation separation unit in which a feed gas containing $H_2$ and CO cools in a first heat exchanger and is separated in at least one distillation column and at least one part of the second gas heats in the separation unit to a third temperature lower than the first temperature and is then sent to mix with the first gas.

7 Claims, 5 Drawing Sheets

(52) U.S. Cl.
CPC .......... *F25J 3/0261* (2013.01); *F25J 3/0271* (2013.01); *C01B 2203/046* (2013.01); *F25J 2200/70* (2013.01); *F25J 2200/76* (2013.01); *F25J 2205/04* (2013.01); *F25J 2205/30* (2013.01); *F25J 2215/02* (2013.01); *F25J 2230/32* (2013.01); *F25J 2245/02* (2013.01); *F25J 2270/02* (2013.01); *F25J 2270/04* (2013.01); *F25J 2270/24* (2013.01)

(56) References Cited

U.S. PATENT DOCUMENTS

| | | | | |
|---|---|---|---|---|
| 2014/0000280 A1* | 1/2014 | Allen-Bradley | ........ | F01D 5/141 60/805 |
| 2014/0291209 A1* | 10/2014 | Van Der Merwe | .... | C10G 1/047 208/390 |
| 2018/0251373 A1* | 9/2018 | Fernandez | .............. | C01B 3/508 |

* cited by examiner

METHOD AND APPARATUS FOR PRODUCING A MIXTURE OF CARBON MONOXIDE AND HYDROGEN

CROSS REFERENCE TO RELATED APPLICATIONS

This application is a § 371 of International PCT Application PCT/FR2016/051865, filed Jul. 20, 2016, which claims the benefit of FR1558788, filed Sep. 18, 2015, both of which are herein incorporated by reference in their entireties.

TECHNICAL FIELD OF THE INVENTION

The present invention relates to a process and to an apparatus for the production of a gas mixture of carbon monoxide and hydrogen.

BACKGROUND OF THE INVENTION

Units for the production of carbon monoxide and hydrogen can be separated into two parts:
generation of synthesis gas (mixture containing $H_2$, CO, $CH_4$, $CO_2$, Ar and $N_2$ essentially),
purification of synthesis gas.
The following are found:
a unit for scrubbing with a liquid solvent in order to remove most of the acid gases present in the synthesis gas,
a unit for purification on a bed of adsorbents,
a unit for cryogenic separation, known as "cold box", for the production of CO or else of $H_2$/CO mixture, known as "oxogas", where the $CH_4$ and $N_2$ contents are low.

In the state of the art, it is known to produce a gas mixture of carbon monoxide and hydrogen by reheating the hydrogen resulting from a cryogenic process for the separation of a mixture of at least hydrogen and carbon monoxide, by reheating the carbon monoxide resulting from the same process, by compressing the carbon monoxide in a compressor and by mixing the reheated hydrogen with the reheated and compressed carbon monoxide. An example of such a process is described in U.S. Pat. No. 4,488,890.

In the example illustrated in FIG. 1, which is not a process according to the invention, the carbon monoxide which is separated cryogenically is produced at the required pressure with a first compressor C1 and exits from the first compressor at a temperature in the vicinity of 100° C., in order to be subsequently cooled in a heat exchanger R with cooling water coming from the main cooling water circuit of the separation process, the temperature of which is approximately 33° C. generally.

The synthesis gas 1 is purified in a purification unit FEP in order to remove the water and the carbon dioxide. The purified gas 3 is cooled in a heat exchanger E1, where it is partially condensed. The partially condensed gas is separated in a phase separator S. The gas formed in the phase separator is divided into two, one part 5 being reheated in the exchanger E1 to form impure hydrogen at approximately 37° C. and the other part 7 being separated in a methane scrubbing column K1. The liquid 9 from the phase separator S is mixed with the vessel liquid 11 from the column K1 and sent, after reduction in pressure, to a stripping column K2.

The top gas from the column K1 represents the hydrogen-rich product 13 of the process.

The top gas from the column K2 represents a waste gas 15.

The vessel liquid 17 from the column K2 is sent to a column K3 which separates the carbon monoxide and the methane present in the liquid 17. A methane-rich liquid 19 exits in the vessel of the column K3, is pressurized in a pump P and is sent into the top of the columns K1, K2. The gaseous carbon monoxide 21 produced at the top of the column K3 is sent to the first compressor C1.

A part 23 of the compressed carbon monoxide is cooled in the exchanger E1 and divided into two. One part 25 is reduced in pressure in the turbine T and remixed with the top gas 21. The remainder 27 is used to reboil the vessel of the column K3 and the vessel of the column K2.

It is thus seen that the separation unit, in this case, consists of a cryogenic distillation apparatus comprising a methane scrubbing column and a column for the separation of carbon monoxide and hydrogen. The invention also applies to other processes supplied from other cryogenic distillation apparatuses and can comprise an apparatus for separation by partial condensation, in particular if the synthesis gas does not contain methane.

The hydrogen-rich fraction 13 produced by the cold box of the separation unit exits from the main exchanger E1 at the warm end and thus at a temperature of approximately 37° C., i.e. a temperature close to the inlet temperature of the synthesis gas and of the fluid coming from the cycle compressor C1.

The carbon monoxide 21, 24 is subsequently mixed with the hydrogen-rich fraction to form an oxogas 27, the temperature of which is in the vicinity of 39° C., this resulting oxogas supplying a compressor C2 before being sent toward a unit for the production of methanol or other compounds.

SUMMARY OF THE INVENTION

It can be advantageous to produce the oxogas 27 at a much colder temperature than the temperature of the general cooling water circuit in order to reduce the intake flow rate by volume of the oxogas compressor C2, to reduce the number of stages of this compression and thus to reduce the capital cost of the compressor and also to reduce its electricity consumption. For example, it may be necessary to produce the oxogas at a maximum temperature of 20° C.

In certain embodiments, the invention proposes to produce an $H_2$/CO mixture, known as "oxogas", at a temperature far below the temperature of the general cooling water circuit and in particular to ensure a low variation around this temperature level.

The mixture of hydrogen and carbon monoxide can comprise any ratio between the hydrogen and the carbon monoxide. Preferably, it contains between 20% and 80% of hydrogen and between 20% and 80% of carbon monoxide, indeed even between 40% and 60% of hydrogen and between 40% and 60% of carbon monoxide.

The cooling of a mixture of the mixture of hydrogen and carbon monoxide, known as "oxogas", is preferably provided by heat exchange with a refrigeration cycle common to the cryogenic separation producing the hydrogen and/or the carbon monoxide for the oxogas.

The mixture produced can be cooled to a temperature of less than 40° C., indeed even of less than 30° C., preferably of less than 20° C.

According to a subject matter of certain embodiments of the invention, there is provided a process for the production of a gas mixture of carbon monoxide and hydrogen in which:
  i) a first gas comprising at least 50% of carbon monoxide is compressed in a first compressor in order to form a first compressed gas cooled to a first temperature, ii) a second gas comprising at least 50% of hydrogen is mixed with the first compressed gas in order to form the gas mixture, iii) at least one of the first and second gases originates from a unit for separation by cryogenic distillation in which a feed gas containing hydrogen and carbon monoxide is cooled in a first heat exchanger and is separated in at least one distillation column, wherein:

a) a part of the first compressed gas is sent to the separation unit, where it is cooled, for example in the first heat exchanger, down to a second temperature which is less than the first temperature, for example down to an intermediate temperature of the first heat exchanger, and is subsequently mixed with the gas mixture or the second gas and/or b) at least a part of the second gas is reheated in the separation unit, for example in the first heat exchanger, up to a third temperature which is less than the first temperature, for example up to an intermediate temperature of the first heat exchanger, and is subsequently sent to be mixed with the first gas.

According to other optional aspects of the invention:

the first and second gases originate from the unit for separation by cryogenic distillation, a part of the second gas is reheated in the separation unit up to a temperature greater than the third temperature and is subsequently sent to be mixed with the first gas, the gas mixture is subsequently compressed in a second compressor, a first part of the first cooled compressed gas is sent to the first or to a second heat exchanger of the separation unit, where it is cooled down to an intermediate temperature of the heat exchanger and is subsequently mixed with the gas mixture or the second gas, and another part of the first cooled compressed gas is cooled to a temperature which is less than the intermediate temperature of the first or second heat exchanger and is used to reheat a distillation column of the unit, a first part of the first cooled compressed gas is sent to the first or to a second heat exchanger, where it is cooled down to an intermediate temperature of the heat exchanger and is subsequently mixed with the gas mixture or the second gas, and another part of the first compressed gas is cooled in the first or second heat exchanger and is reduced in pressure in a turbine in order to provide the unit with frigories, only a first part of the first gas is cooled in a cooler downstream of the first compressor and another part of the first gas is withdrawn upstream of the cooler and mixed with the first part and/or the gas mixture in order to regulate the temperature thereof.

According to another subject matter of certain embodiments of the invention, there is provided an apparatus for the production of a gas mixture of carbon monoxide and hydrogen comprising:

a first compressor, means for sending a first gas comprising at least 50% of carbon monoxide to be compressed in the first compressor in order to form a first compressed and cooled gas in order to form a first compressed gas cooled to a first temperature, means for mixing a second gas comprising at least 50% of hydrogen with the first compressed gas in order to form the gas mixture, a unit for separation by cryogenic distillation, at least one of the first and second gases originating from the unit for separation by cryogenic distillation, a first heat exchanger, means for sending a feed gas containing hydrogen and carbon monoxide to be cooled in the first heat exchanger and to be separated in at least one distillation column, wherein it comprises:

a) means for sending a part of the first compressed gas to the separation unit to be cooled, for example in the first heat exchanger, down to a second temperature which is less than the first temperature, for example down to an intermediate temperature of the first heat exchanger, and subsequently to be mixed with the gas mixture or the second gas and/or b) means for sending at least a part of the second gas to be reheated in the separation unit, for example in the first heat exchanger, up to a third temperature which is less than the first temperature, for example up to an intermediate temperature of the first heat exchanger, and subsequently to be mixed with the first gas.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The invention will be described in more detail with reference to the figures, FIGS. 2 to 5 representing processes according to the invention.

Figure 1:
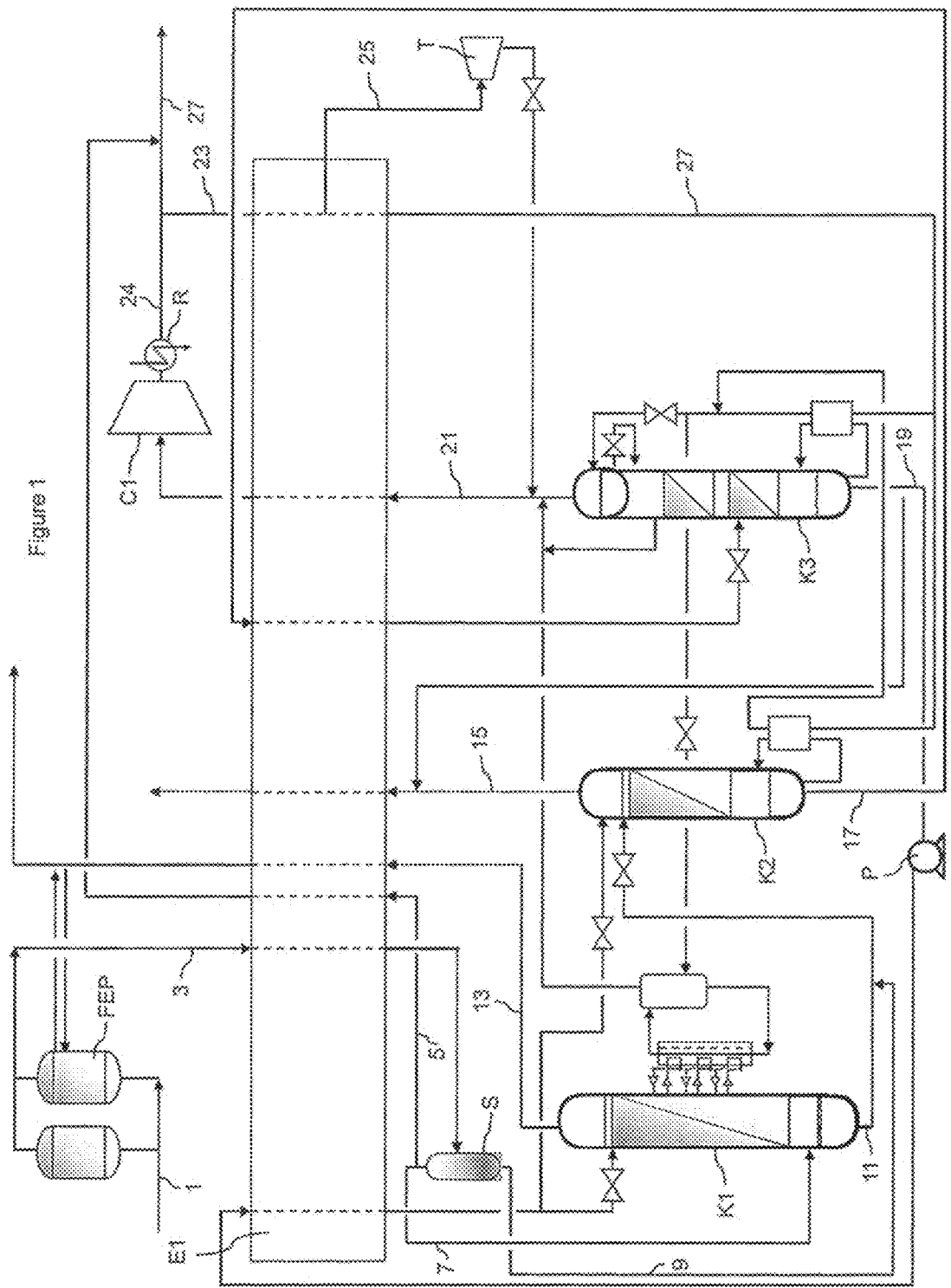
FIG. 1 represents an embodiment of the prior art.

The separation in the cryogenic separation unit is carried out in FIGS. 2 to 5 in the same way as for FIG. 1. Other cryogenic separations can also be used.

Figure 2:
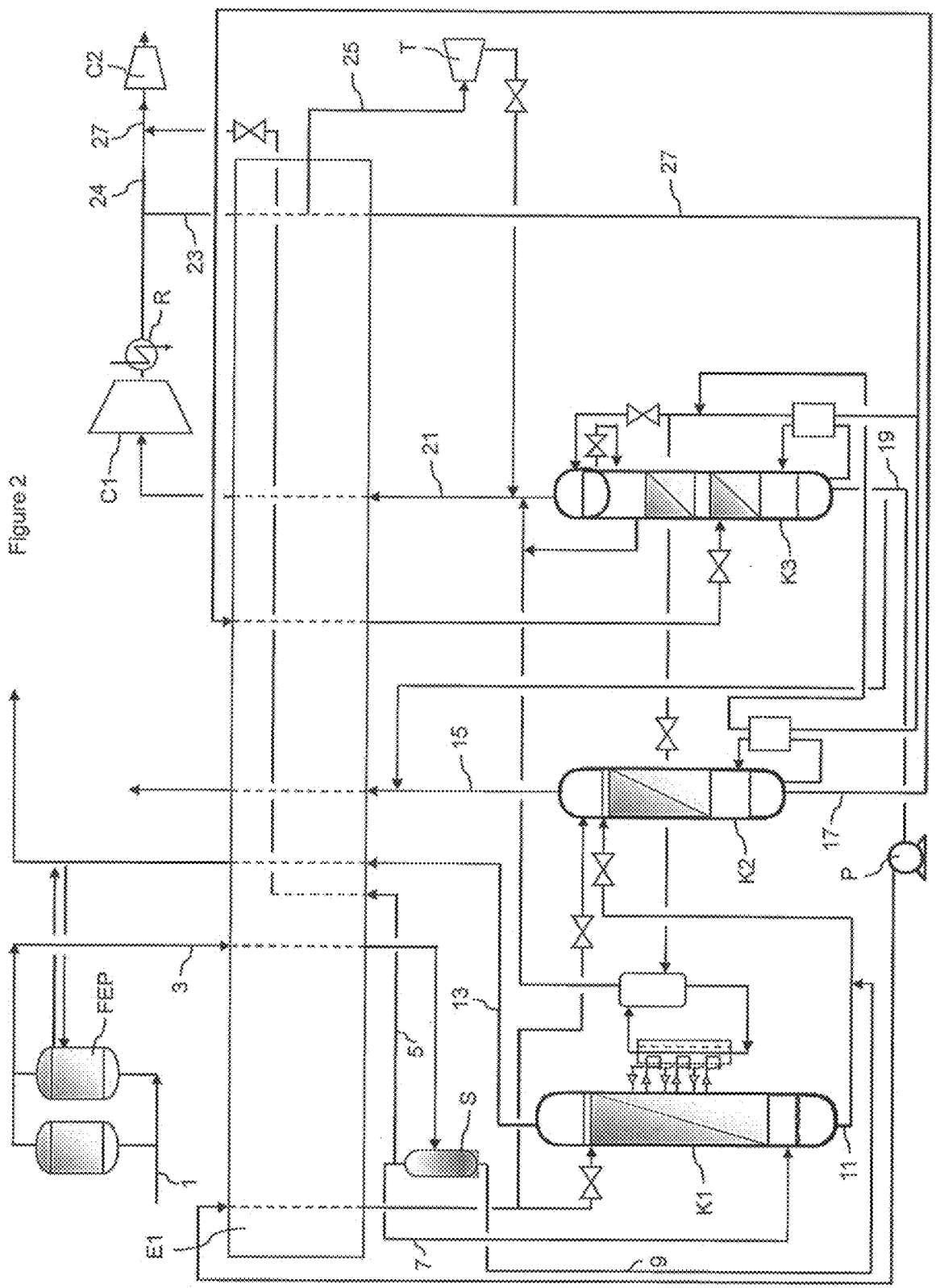
FIG. 2 represents an embodiment of the present invention.

One solution according to the invention, illustrated in FIG. 2, is to exit the hydrogen-rich fraction 5 from the cold box at a colder temperature than the warm end of the heat exchanger E1. Thus, the fraction is reheated up to a temperature which is less than that of the carbon monoxide 23, 24 cooled in the cooler R, for example 4° C., and mixed with the CO produced directly by the CO compressor at 41° C. in order to produce a gas mixture 27, known as "oxogas", at 20° C. However, this solution does not make it possible to satisfactorily control the outlet temperature of the hydrogen-rich fraction and thus does not make it possible to satisfactorily control the temperature of the oxogas mixture 27. This has the disadvantage of creating disruptions in the intake flow rate by volume of the oxogas compressor C2, which can result in a shutdown of the compressor.

Figure 3:
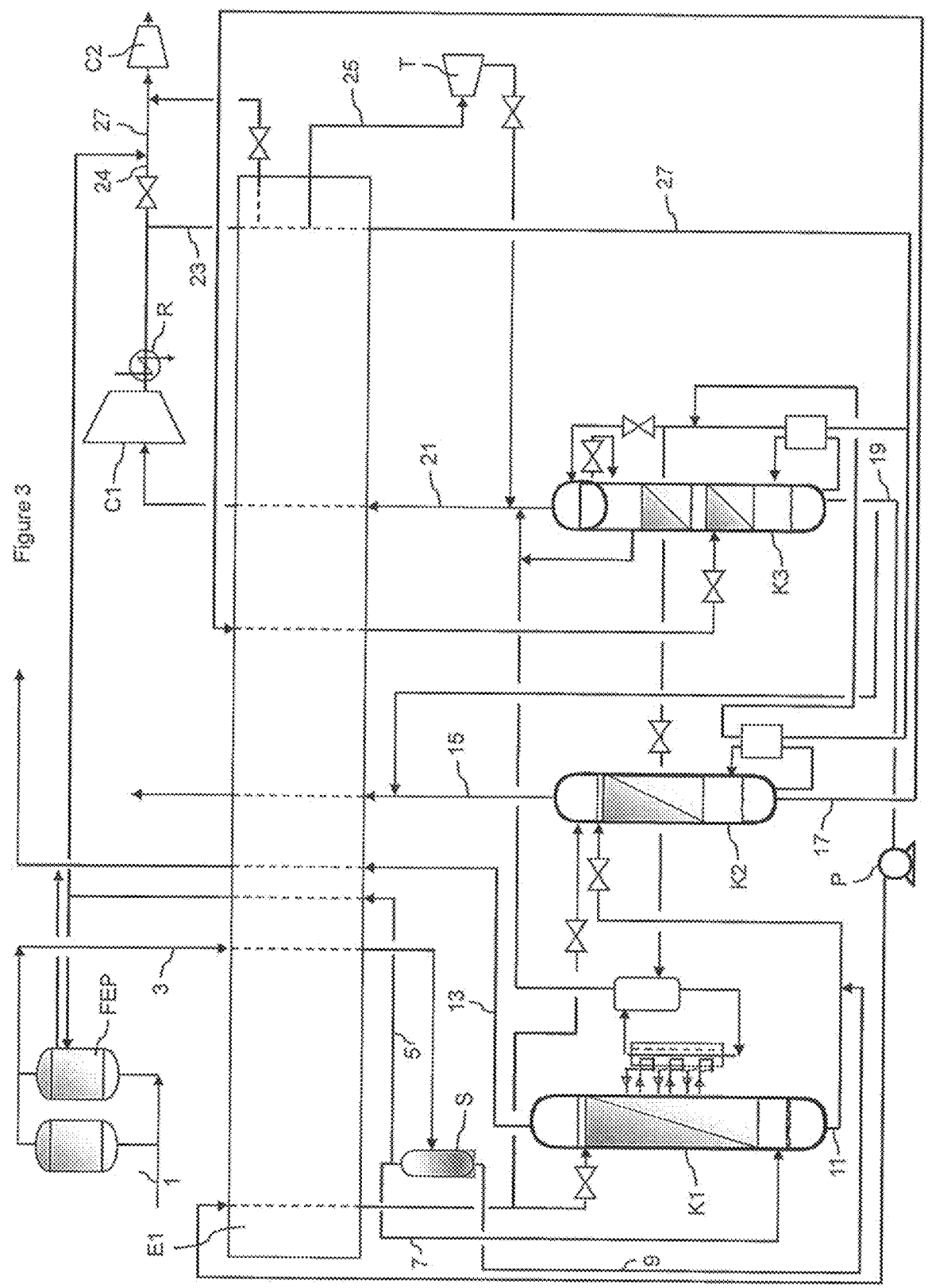
FIG. 3 represents another embodiment of the present invention.

According to the solution of FIG. 3, a part 23 of the CO produced by the CO compressor C1 and cooled by the cooler R is then cooled in the main exchange line E1 of the cold box down to a temperature of less than 39° C., for example of approximately 17° C. The energy for cooling the CO produced is contributed by the cycle compressor C1 common to the separation of the synthesis gas, which avoids the capital costs of an additional refrigerating unit. A part 26 of the carbon monoxide taken to this temperature of less than 39° C. is sent to be mixed with the cooled carbon monoxide 24 or the mixture of carbon monoxide 24 and hydrogen 5. This short-circuiting of the CO between the compressor C1 and the outlet of the exchanger of the cold box makes it possible to ensure a better stability of the temperature of the oxogas.

This has the effect of also reducing the temperature of the hydrogen 5, which exits from the warm end of the heat exchanger E1 at 10° C.

The temperature of the oxogas 27 can be precisely regulated in order to be in the vicinity of a predetermined temperature, for example 20° C.

Figure 4:
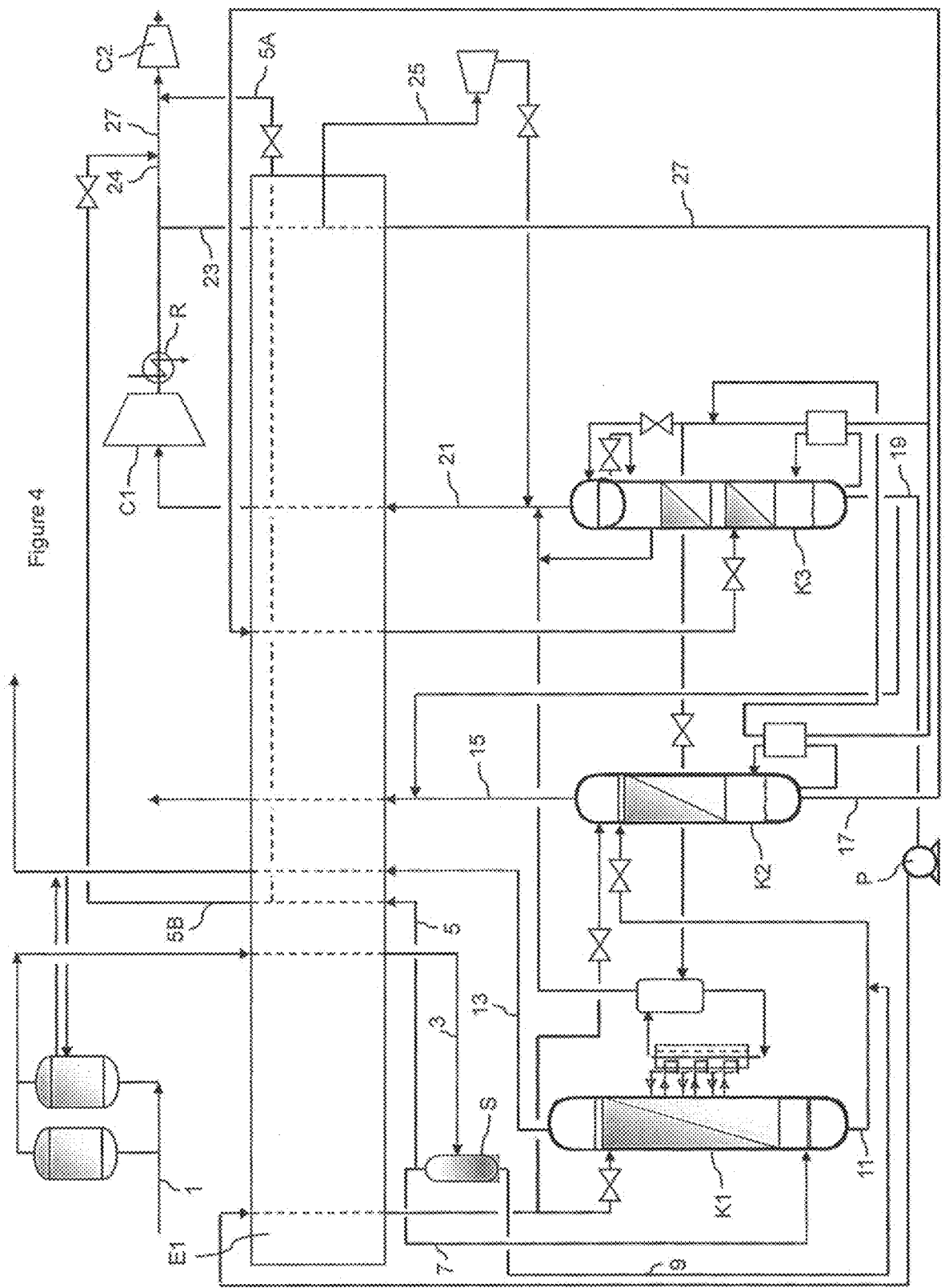
FIG. 4 represents another embodiment of the present invention.

According to the solution of FIG. 4, the temperature of the oxogas 27 can be regulated by adding hydrogen to the carbon monoxide at two different temperatures. The hydrogen-rich fraction 5 is separated into two and the two parts are produced at two different temperature levels by the main exchanger of the separation cold box. In this instance, the fraction 5A is reheated up to an intermediate temperature of the heat exchanger E1, for example 0° C., and the fraction 5B is reheated up to a higher temperature, for example of 10° C.

Figure 5:
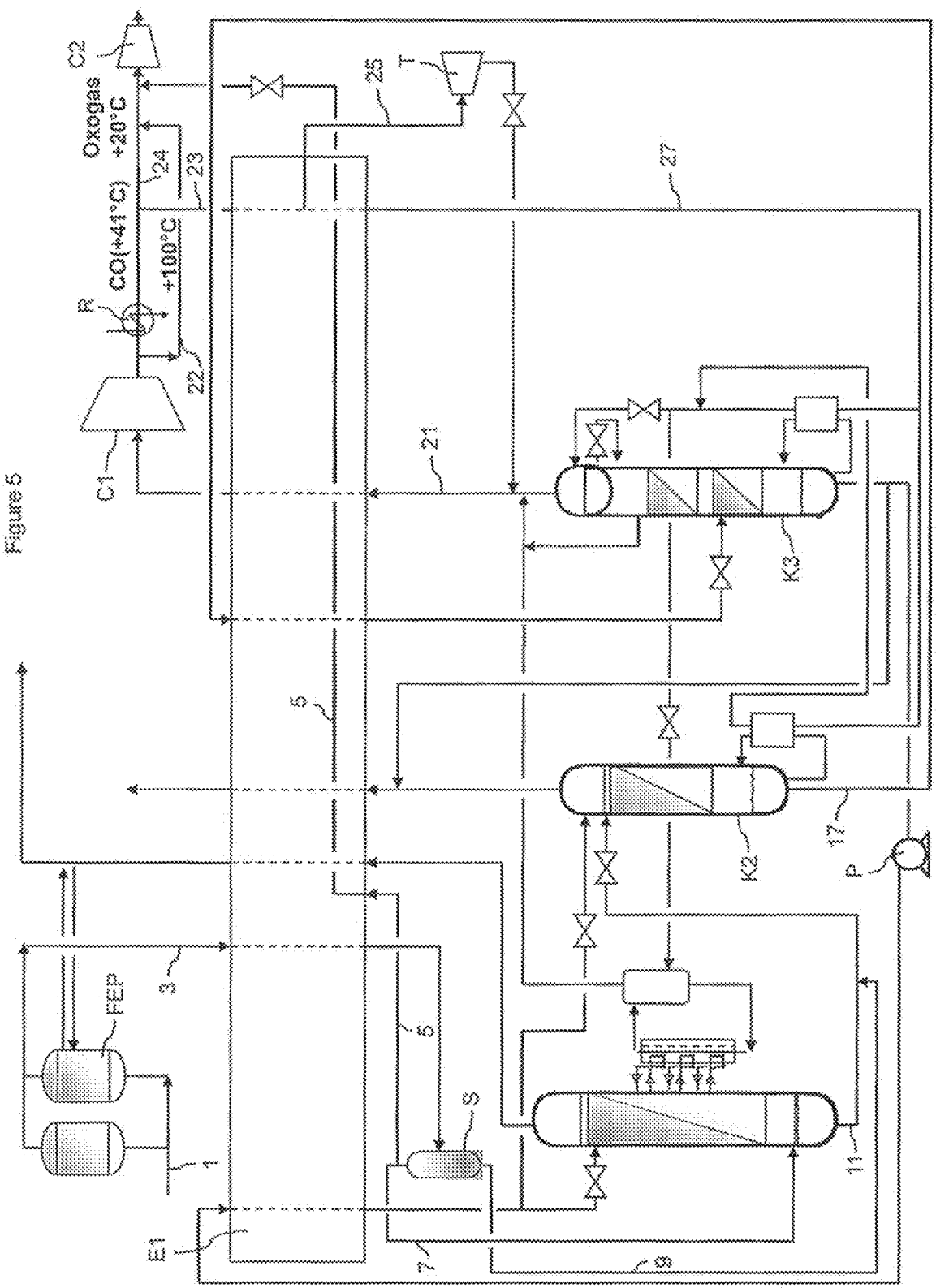
FIG. 5 represents another embodiment of the present invention.

According to the solution of FIG. 5, the hydrogen 5 is completely reheated to a low temperature, for example of 0° C., and mixed with the carbon monoxide 24 at this temperature at the outlet of the cooler R. The regulation of the temperature can be adjusted by adding a part 22 of the carbon monoxide withdrawn upstream of the cooler R at 100° C. In this way, the temperature of the oxogas 27 can be regulated at a predetermined value, for example 20° C.

It is obviously possible to combine together the solutions illustrated. For example, the mixing of compressed and uncooled carbon monoxide 22 in order to form the oxogas 27 can be applied to FIGS. 2 to 4.

Likewise, the carbon monoxide cooled in the separation unit can be used to regulate the temperature of the oxogas in FIGS. 2, 4 and 5.

It is not necessary for all the heat exchanges of carbon monoxide to be cooled and/or of hydrogen to be reheated to be carried out in the heat exchanger where the feed gas is cooled.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for the production of a gas mixture of carbon monoxide and hydrogen in which:
   i) compressing a first gas comprising at least 50% of carbon monoxide in a first compressor in order to form a first compressed gas;
   ii) cooling the first compressed gas using a water cooler to a first temperature to form a cooled first compressed gas;
   iii) mixing a second gas comprising at least 50% of hydrogen with the cooled first compressed gas in order to form the gas mixture;
   wherein at least one of the first and second gases originates from a unit for separation by cryogenic distillation in which a feed gas containing hydrogen and carbon monoxide is cooled in a first heat exchanger and is separated in at least one distillation column;
   wherein the process further includes a step of reducing the temperature of the gas mixture selected from the group consisting of:
   a) a part of the cooled first compressed gas is sent to the separation unit, where the part of the cooled first compressed gas is cooled down to a second temperature, which is less than the first temperature and is subsequently, without being heated within the first heat exchanger of the separation unit, mixed with the gas mixture or the second gas;
   b) at least a part of the second gas is reheated in the first heat exchanger of the separation unit up to a third temperature, which is less than the first temperature and is less than a temperature of a warm end of the first heat exchanger, and is subsequently sent to be mixed with the cooled first compressed gas without being further heated within the first heat exchanger of the separation unit, and
   c) combinations thereof.

2. The process as claimed in claim 1, in which the first and second gases originate from the unit for separation by cryogenic distillation.

3. The process as claimed in claim 1, in which a part of the second gas is reheated in the separation unit up to a temperature greater than the third temperature and is subsequently sent to be mixed with the first gas.

4. The process as claimed in claim 1, in which the gas mixture is subsequently compressed in a second compressor.

5. The process as claimed in claim 1, in which a first part of the first cooled compressed gas is sent to the first or to a second heat exchanger of the separation unit, where it is cooled down to an intermediate temperature of the heat exchanger and is subsequently mixed with the gas mixture or the second gas, and another part of the first cooled compressed gas is cooled to a temperature which is less than the intermediate temperature of the first or second heat exchanger and is used to reheat a distillation column of the unit.

6. The process as claimed in claim 1, in which a first part of the cooled first compressed gas is sent to the first or to a second heat exchanger, where it is cooled down to an intermediate temperature of the heat exchanger and is subsequently mixed with the gas mixture or the second gas, and another part of the cooled first compressed gas is cooled in the first or second heat exchanger and is reduced in pressure in a turbine in order to provide the unit with frigories.

7. The process as claimed in claim 1, in which only a first part of the first gas is cooled in a cooler downstream of the first compressor and another part of the first gas is withdrawn upstream of the cooler and mixed with the first part and/or the gas mixture in order to regulate the temperature thereof.

\* \* \* \* \*